United States Patent
Kim et al.

(10) Patent No.: US 8,927,144 B2
(45) Date of Patent: Jan. 6, 2015

(54) REINFORCING MATERIAL FOR BATTERY CELL AND BATTERY CELL INCLUDING THE SAME

(71) Applicant: Samsung SDI Co., Ltd., Yongin (KR)

(72) Inventors: Jun-Sik Kim, Yongin (KR); Su-Hee Han, Yongin (KR); Chong-Hoon Lee, Yongin (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 0 days.

(21) Appl. No.: 13/745,340

(22) Filed: Jan. 18, 2013

(65) Prior Publication Data
US 2013/0189561 A1   Jul. 25, 2013

(30) Foreign Application Priority Data
Jan. 19, 2012   (KR) .................. 10-2012-0006407

(51) Int. Cl.
| H01M 10/16 | (2006.01) |
| H01M 2/14 | (2006.01) |
| H01M 2/16 | (2006.01) |
| H01M 2/02 | (2006.01) |
| H01M 10/052 | (2010.01) |

(52) U.S. Cl.
CPC ............. *H01M 2/14* (2013.01); *H01M 2/166* (2013.01); *H01M 2/0207* (2013.01); *H01M 10/052* (2013.01)
USPC ........................ 429/208; 429/186; 429/237

(58) Field of Classification Search
USPC .......................................... 429/208, 186, 237
See application file for complete search history.

(56) References Cited

U.S. PATENT DOCUMENTS

| 2003/0003367 A1 | 1/2003 | Roh et al. |
| 2009/0246612 A1 * | 10/2009 | Naoi et al. .................... 429/144 |

FOREIGN PATENT DOCUMENTS

JP    2006-120593 A    5/2006

* cited by examiner

*Primary Examiner* — Jane Rhee
(74) *Attorney, Agent, or Firm* — Knobbe Martens Olson & Bear, LLP

(57) ABSTRACT

In one aspect, a battery cell including: an electrode assembly, wherein the electrode assembly includes a first electrode plate, a second electrode plate, and a separator disposed between the first electrode plate and the second electrode plate; electrode tabs connected to the electrode plate and the second electrode plate, and extending from one side of the electrode assembly; a case for sealing the electrode assembly and an electrolyte; and a reinforcing material disposed in at least a region between the electrode assembly and the case, and comprising ceramic material and a polymer gel is provided.

19 Claims, 6 Drawing Sheets

REINFORCING MATERIAL FOR BATTERY CELL AND BATTERY CELL INCLUDING THE SAME

CROSS-REFERENCE TO RELATED APPLICATION

This application claims the benefit of Korean Patent Application No. 10-2012-0006407, filed on Jan. 19, 2012, in the Korean Intellectual Property Office, the disclosure of which is incorporated herein in its entirety by reference.

BACKGROUND

1. Field

One or more embodiments relate to reinforcing materials for battery cells and secondary batteries including the same.

2. Description of the Related Technology

Secondary batteries are widely used in small high-tech electronic devices such as mobile phones, personal digital assistants (PDAs), laptop computers, etc.

Secondary batteries are used for a long period of time by being recharged and discharged. A lack of reliability is emerging as a critical problem due to the environment where the secondary batteries are used. Representative reliability test items include durability with respect to the temperature, rigidity, electrostatic discharge (ESD), charging and discharging tests, and the like.

Rigidity influences electrical characteristics of secondary batteries as well as mechanical characteristics. For example, if an external shock is applied to a secondary battery, an electrical short may occur in the secondary battery or a problem may arise in the coupling between elements of the secondary battery, which influences an operation of the secondary battery.

SUMMARY

Some embodiments provide reinforcing materials for battery cells and secondary batteries including the same.

Additional aspects will be set forth in part in the description which follows and, in part, will be apparent from the description, or may be learned by practice of the presented embodiments.

Some embodiments provide a battery cell including an electrode assembly, wherein the electrode assembly includes a first electrode plate, a second electrode plate, and a separator disposed between the first electrode plate and the second electrode plate; electrode tabs connected to the first electrode plate and the second electrode plate, and extending from one side of the electrode assembly; a case for sealing the electrode assembly and an electrolyte; and a reinforcing material disposed in at least a region between the electrode assembly and the case, and also including ceramic material and a polymer gel.

In certain embodiments, the reinforcing material may be adhered to the electrode assembly.

In certain embodiments, the electrode assembly may have a first end portion and a second end portion. In certain embodiments, the reinforcing material may be adhered to the electrode assembly, and may be adhered to at least one of a first end portion of the electrode assembly from which the electrode tabs extend and a second end portion of the electrode assembly disposed in an opposite end to which the first end portion is disposed.

In certain embodiments, the reinforcing material may be adhered to the electrode assembly to surround sides thereof.

In certain embodiments, the first electrode plate, the second electrode plate, and the separator may be configured to have different sizes so that an edge of the electrode assembly has a step shape, and wherein the reinforcing material covers the step-shaped edge of the electrode assembly.

In certain embodiments, the edge of the electrode assembly may be at least one of the first end portion of the electrode assembly from which the electrode tabs extend and the second end portion of the electrode assembly disposed in an opposite direction to which the first end portion is disposed.

In certain embodiments, the ceramic material may be from about 25% to about 80% of the reinforcing material.

In certain embodiments, the reinforcing material may include 100 parts by weight of the polymer gel and about 40 to about 400 parts by weight of the ceramic material.

In certain embodiments, the reinforcing material may include 100 parts by weight of the ceramic material and 80 or higher parts by weight of the polymer gel.

In certain embodiments, the ceramic material may include one or more components selected from the group consisting of aluminum oxide ($Al_2O_3$), titanium dioxide ($TiO_2$), barium titanate ($BaTiO_3$), silicon dioxide ($SiO_2$), magnesium oxide (MgO), and zinc oxide (ZnO).

In certain embodiments, the polymer gel may be adhesive.

In certain embodiments, the polymer gel may include acrylate-based polymer or polyvinylidene fluoride-based (PVDF-based) polymer.

In certain embodiments, the separator includes at least one material selected from the group consisting of polyethylene (PE), polystyrene (PS), polypropylene, and co-polymer of PE and polypropylene with polyvinylidene fluoride-cohexafluoropropylene (PVDF-HFP) co-polymer. In certain embodiments, the separator may be manufactured by coating any one material selected from the group consisting of polyethylene (PE), polystyrene (PS), polypropylene, and co-polymer of PE and polypropylene with polyvinylidene fluoride-cohexafluoropropylene (PVDF-HFP) co-polymer.

In certain embodiments, the case may be a soft pouch type.

Some embodiments provide a reinforcing material for a battery cell includes an electrode assembly, an electrolyte, and a case for sealing the electrode assembly and the electrolyte, wherein the reinforcing material is disposed between the electrode assembly and the case, and includes ceramic material and a polymer gel. Some embodiments provide a secondary battery comprising a battery cell, a reinforcing material for the battery cell, an electrode assembly, an electrolyte, and a case for sealing the electrode assembly and the electrolyte, wherein the reinforcing material is disposed between the electrode assembly and the case, wherein said reinforcing material further comprises ceramic material and a polymer gel.

In certain embodiments, the reinforcing material may include 100 parts by weight of the polymer gel and about 40 to about 400 parts by weight of the ceramic material.

In certain embodiments, the reinforcing material may include 100 parts by weight of the ceramic material and 80 or higher parts by weight of the polymer gel.

In certain embodiments, the polymer gel may be adhesive.

In certain embodiments, the ceramic material may include one or more components selected from the group consisting of $Al_2O_3$, $TiO_2$, $BaTiO_3$, $SiO_2$, MgO, and ZnO.

In certain embodiments, the polymer gel may include acrylate-based polymer or PVDF-based polymer.

BRIEF DESCRIPTION OF THE DRAWINGS

These and other aspects will become apparent and more readily appreciated from the following description of the embodiments, taken in conjunction with the accompanying drawings of which.

DETAILED DESCRIPTION

The advantages and features of the present embodiments and methods of achieving the advantages and features will be described more fully with reference to the accompanying drawings, in which exemplary embodiments of the disclosure are shown. The present embodiments should not be construed as being limited to the exemplary embodiments set forth herein. As those skilled in the art would realize, the described embodiments may be modified in various different ways, all without departing from the spirit or scope of the present disclosure. Meanwhile, the terminology used herein is for the purpose of describing particular embodiments only and is not intended to be limiting of the present embodiments.

As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. It will be understood that, although the terms first, second, etc. may be used herein to describe various elements, these elements should not be limited by these terms. These terms are only used to distinguish one element from another.

Figure 1:
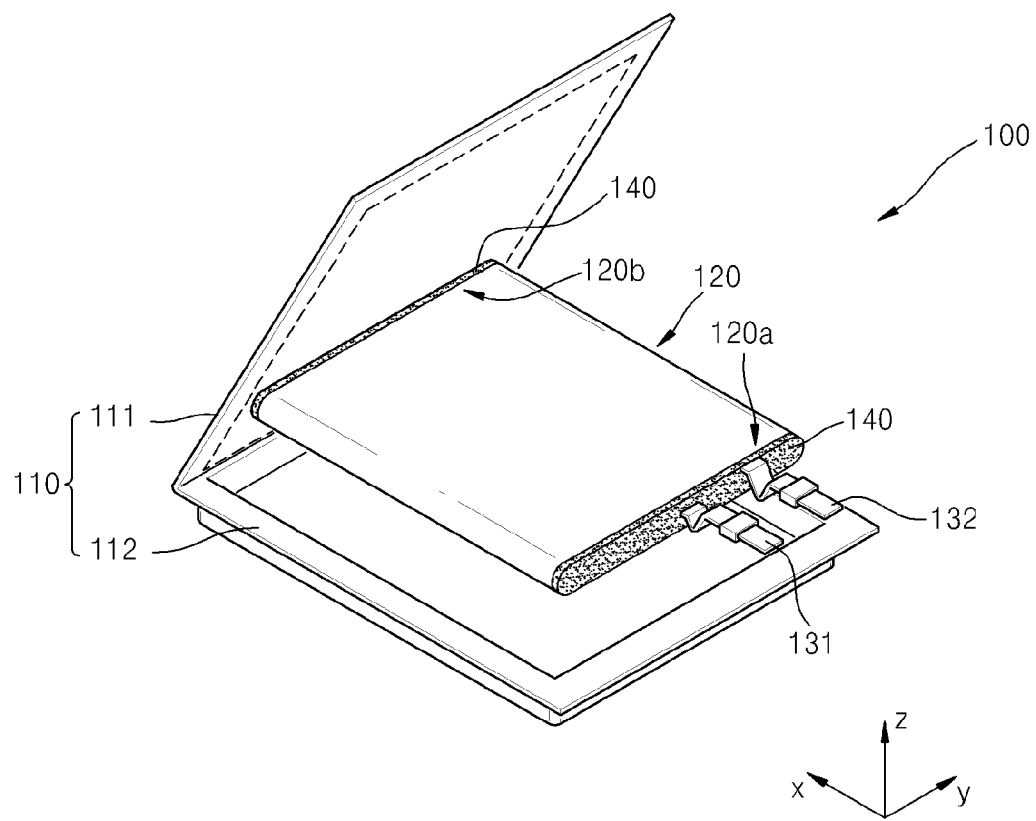
FIG. 1 is an exploded perspective view schematically illustrating a battery cell according to one embodiment.

FIG. 1 is an exploded perspective view schematically illustrating a battery cell 100 according to one embodiment.

Referring to FIG. 1, the battery cell 100 includes a case 110, an electrode assembly 120 accommodated inside the case 110, a reinforcing material 140, and electrode tabs 130 electrically connected to the electrode assembly 120. The electrode tabs 130 extend from one side of the electrode assembly 120. The reinforcing material 140 is disposed on a first end portion 120a and a second end portion 120b of the electrode assembly 120 from which the electrode tabs 130 extend.

In certain embodiments, the case 110 accommodates the electrode assembly 120, the reinforcing material 140, and an electrolyte therein, and may include an upper case 111 and a lower case 112 as shown in FIG. 1. In certain embodiments, the upper case 111 and the lower case 112 may be integrally bonded to each other along edges thereof to seal the electrode assembly 120. In certain embodiments, an accommodation space in which the electrode assembly 120 is accommodated may be formed in the lower case 112 by press working.

In certain embodiments, the case 110 may be manufactured as a pouch type battery. For example, the case 110 may have a multi-layer structure including a thermal bonding layer that has thermal fusibility and acts as a sealing member, a metal layer that maintains mechanical rigidity and acts as a barrier for preventing moisture and oxygen from penetrating, and an insulating layer. In certain embodiments, the thermal bonding layer may be formed on an inner side of the metal layer, and the insulating layer may be formed on an outer side thereof.

In certain embodiments, the reinforcing material 140 may be disposed between the case 110 and the electrode assembly 120. For example, the reinforcing material 140 may be disposed on the first end portion 120a and the second end portion 120b of the electrode assembly 120 to enhance rigidity of the battery cell 100. In certain embodiments, the pouch type battery case 110 may be soft. However, the case 110 may enhance the rigidity of the battery cell 100 as a whole by including the reinforcing material 140.

Figure 2:
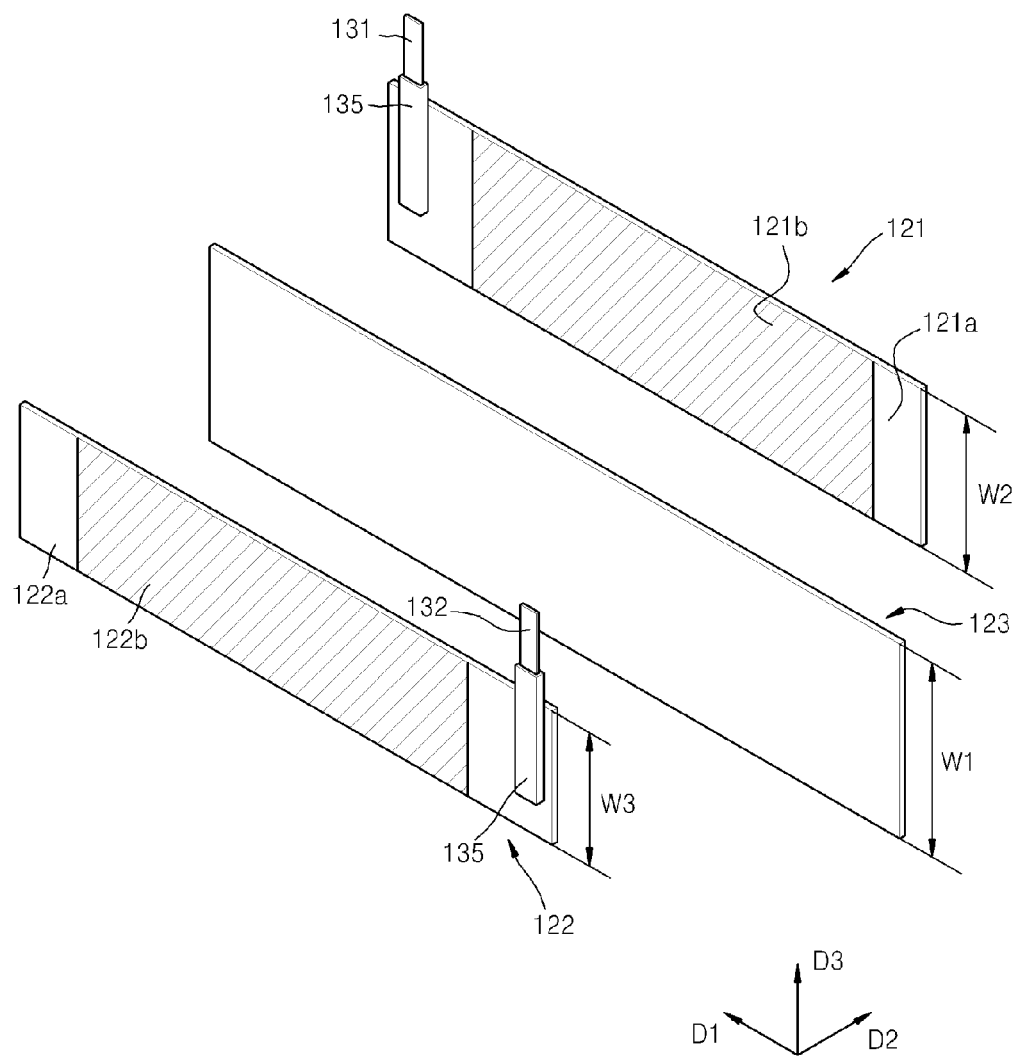
FIG. 2 is an exploded perspective view schematically illustrating an electrode assembly before being assembled according to an aspect of the present embodiments.
Figure 3:
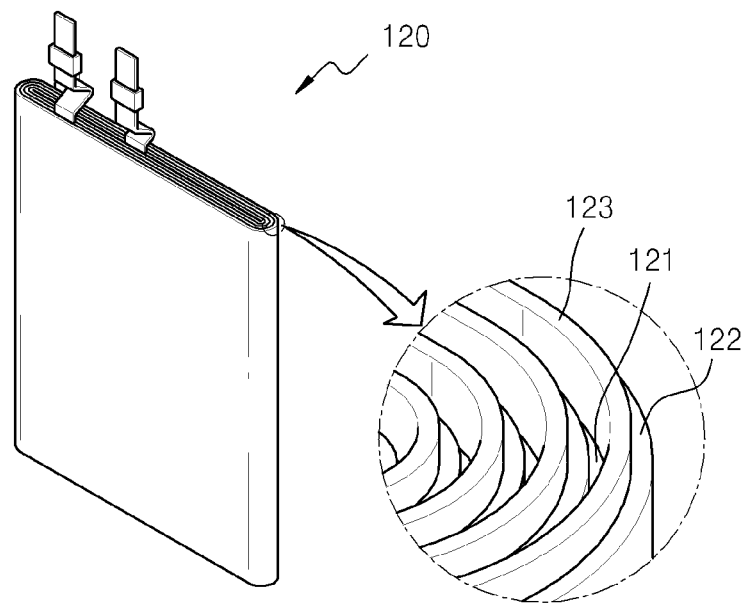
FIG. 3 is a perspective view illustrating the electrode assembly of FIG. 2.
Figure 4:
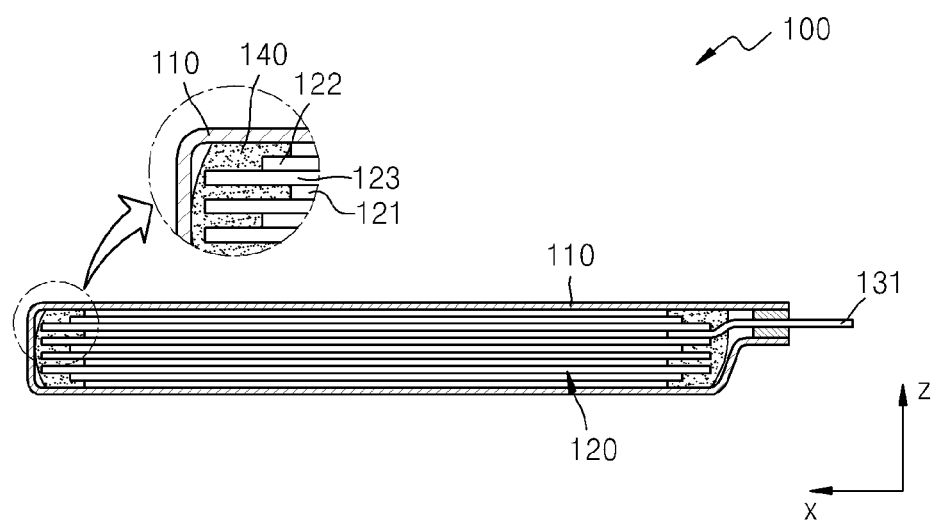
FIG. 4 is a side cross-sectional view illustrating a state where a battery cell is cut in a direction in which electrode tabs extend according to an aspect of the present embodiments.

In certain embodiments, the reinforcing material 140 may also protect a step formed between the first end portion 120a and the second end portion 120b of the electrode assembly 120. FIGS. 2 through 4 provide more detail with reference to this protection.

FIG. 2 is an exploded perspective view schematically illustrating the electrode assembly 120 before being assembled according to an aspect of the present embodiments. FIG. 3 is a perspective view illustrating the electrode assembly 120 of FIG. 2.

Referring to FIGS. 2 and 3, the electrode assembly 120 may be manufactured by winding a positive electrode plate 121, a negative electrode plate 122, and a separator 123 disposed between the positive electrode plate 121 and the negative electrode plate 122 in a jelly-roll shape.

In certain embodiments, the positive electrode plate 121 may include a positive active material portion 121b formed by applying a positive active material to a surface of a positive current collector formed of aluminum or the like, and a non-positive active material portion 121a not including a positive active material. In certain embodiments, the positive active material may be, for example, a lithium chalcogenide compound or a lithium transition metal oxide such as $LiCoO_2$, $LiNiO_2$, $LiMnO_2$, or $LiMnO_4$. In certain embodiments, a positive electrode tab 131 having a predetermined length is bonded to the non-positive active material portion 121a. In certain embodiments, an insulating tape 135 may be provided on the positive electrode tab 131 in order to prevent a short circuit between the positive electrode plate 121 and the negative electrode plate 122.

In certain embodiments, the negative electrode plate 122 includes a negative active material portion 122b formed by applying a negative active material to a surface of a negative current collector formed of nickel or the like, and a non-negative active material portion 122a not including a negative active material. In certain embodiments, the negative active material may be a carbon material such as crystalline carbon, carbon composite, or carbon fiber, a lithium metal, or a lithium alloy. In certain embodiments, a negative electrode tab 132 having a predetermined length is bonded to the non-negative active material portion 122a. In certain embodiments, the insulating tape 135 may be provided on the negative electrode tab 132 in order to prevent the short circuit between the positive electrode plate 121 and the negative electrode plate 122.

The separator 123 prevents the short circuit between the positive electrode plate 121 and the negative electrode plate 122, and enables movement of charges. In certain embodiments, the separator 123 may be manufactured by coating one or more materials selected from the group consisting of polyethylene (PE), polystyrene (PS), polypropylene, and co-polymer of PE and polypropylene with polyvinylidene fluoride-cohexafluoropropylene (PVDF-HFP) co-polymer. The separator 123 manufactured as described above increases adherence between interfaces of the positive electrode plate 121 and the negative electrode plate 122, and allows the electrolyte to easily permeate through a gap formed by the PVDF-HFP co-polymer and to be uniformly distributed.

In certain embodiments, the electrolyte may include a liquid electrolyte or a gel-type electrolyte. In certain embodiments, the gel-type electrolyte may include a physical gel electrolyte which is a linear polymer impregnated with an organic electrolyte that is an ion conductor due to a physical phenomenon, or a chemical gel electrolyte which is a cross-linked polymer impregnated with an organic electrolyte.

In certain embodiments, a width W1 of the separator 123 in a direction D3 may be greater than widths W2 and W3 of the positive electrode plate 121 and the negative electrode plate 122, respectively, in order to effectively prevent the short circuit between the positive electrode plate 121 and the negative electrode plate 122. In certain embodiments, the separator 123 having the large width W1 may flexibly respond to a temperature variation with respect to an operation of the battery cell 100. Thus, the separator 123 may effectively prevent the short circuit between the positive electrode plate 121 and the negative electrode plate 122 irrespective of a high temperature and a low temperature.

In certain embodiments, the electrode assembly 120 may be manufactured by sequentially stacking and winding the positive electrode plate 121, the separator 113, and the negative electrode plate 122. In this regard, the width W1 of the separator 123 is greater than the widths W2 and W3 of the positive electrode plate 121 and the negative electrode plate 122, respectively, so that the separator 123 protrudes in the direction D3 by a predetermined length compared to the positive electrode plate 121 and the negative electrode plate 122. Thus, a step is formed between the first end portion 120a and the second end portion 120b of the electrode assembly 120 due to the difference in the widths of the positive electrode plate 121, the separator 113, and the negative electrode plate 122.

FIG. 4 is a side cross-sectional view illustrating a state where the battery cell 100 is cut in a direction in which electrode tabs extend according to an aspect of the present embodiments. For convenience of description, FIG. 4 illustrates the battery cell 100 that is cut in a line across the positive electrode tab 131.

Referring to FIG. 4, the first end portion 120a and the second end portion 120b of the electrode assembly 120 included in the case 110 have a step shape, and the reinforcing material 140 may be disposed on the first and second end portions 120a and 120b. The reinforcing material 140 may be adhered to the first end portion 120a and the second end portion 120b of the electrode assembly 120.

In certain embodiments, the reinforcing material 140 may include ceramic material and a polymer gel.

In certain embodiments, the ceramic material may include one or more components selected from the group consisting of aluminum oxide ($Al_2O_3$), titanium dioxide ($TiO_2$), barium titanate ($BaTiO_3$), silicon dioxide ($SiO_2$), magnesium oxide (MgO), and zinc oxide (ZnO).

In certain embodiments, the ceramic material may include powders having an average particle diameter from about 20 μm to about 2000 μm, for example, powders from about 100 μm to about 600 μm. If the particle diameter of ceramic material powders exceeds about 2000 μm, the ceramic material powders do not mix with the polymer gel but the ceramic material powders sink, and thus it is difficult to manufacture the reinforcing material 140 in a uniform state. If the particle diameter of ceramic material powders is below about 20 μm, stress between the ceramic material powder particles increases to form secondary agglomerates in which ceramic material powder particles agglomerate, and thus it is difficult to uniformly distribute the reinforcing material 140 in the polymer gel.

In certain embodiments, the polymer gel may include an adhesive material in such a way that the reinforcing material 140 may be adhered to the electrode assembly 120. For example, the polymer gel may include acrylate-based polymer and PVDF-based polymer. Although the polymer gel includes the acrylate-based polymer and the PVDF-based polymer in the present embodiment, any type of polymer gel may be used as long as they are adhesive.

In certain embodiments, the reinforcing material 140 may include ceramic material and a polymer gel, in which the ceramic material occupies a proportion from about 25% to about 80% of the reinforcing material 140. If the proportion of the ceramic material is below 25% or exceeds 80% of the reinforcing material 140, it is difficult to uniformly mix the ceramic material with the polymer gel so as to form the reinforcing material 140, and the bonding force between the polymer gel and the ceramic material deteriorates, thereby decreasing the rigidity of the reinforcing material 140 and increasing manufacturing costs.

In certain embodiments, the reinforcing material 140 may include 100 parts by weight of polymer gel and about 40 to about 400 parts by weight of ceramic material. A compression breaking rate of the reinforcing material 140 according to the content of ceramic material with respect to 100 parts by weight of polymer gel is shown in Table 1 below.

Table 1 shows the compression breaking rate with respect to the content of ceramic material and polymer gel consisting of the reinforcing material 140 included in the battery cell 100 according to the present embodiments. The compression breaking rate is a value indicated by % of a contraction length of the reinforcing material 140 just before the reinforcing material 140 is compressed and broken with respect to an initial diameter thereof. That is, the compression breaking rate is (contraction length before being broken/initial length)×100.

TABLE 1

| reinforcing material | | | ceramic material/ reinforcing material (%) | compression breaking rate (%) |
|---|---|---|---|---|
| ceramic material | polymer gel | electrolyte | | |
| 0 | 100 | 1900 | 0 | 18.6 |
| 20 | 100 | 1880 | 16.7 | 25.6 |
| 40 | 100 | 1860 | 28.6 | 51.3 |
| 100 | 100 | 1800 | 50.0 | 56.9 |
| 140 | 100 | 1760 | 58.3 | 57 |
| 200 | 100 | 1700 | 66.7 | 55 |
| 400 | 100 | 1500 | 80 | 51.2 |

According to another aspect of the present embodiments, the reinforcing material 140 may include 100 parts by weight of ceramic material and 80 or higher parts by weight of polymer gel. A compression breaking rate of the reinforcing material 140 according to the content of polymer gel with respect to 100 parts by weight of ceramic material is shown in Table 2 below.

TABLE 2

| ceramic material | polymer gel | electrolyte | ceramic material/ reinforcing material (%) | compression breaking rate (%) |
|---|---|---|---|---|
| 100 | 60 | 1840 | 62.5 | 8.9 |
| 100 | 80 | 1820 | 55.6 | 49.6 |
| 100 | 100 | 1800 | 50.0 | 56.9 |
| 100 | 120 | 1780 | 45.5 | 60.3 |
| 100 | 140 | 1760 | 41.7 | 62.1 |

Figure 5:
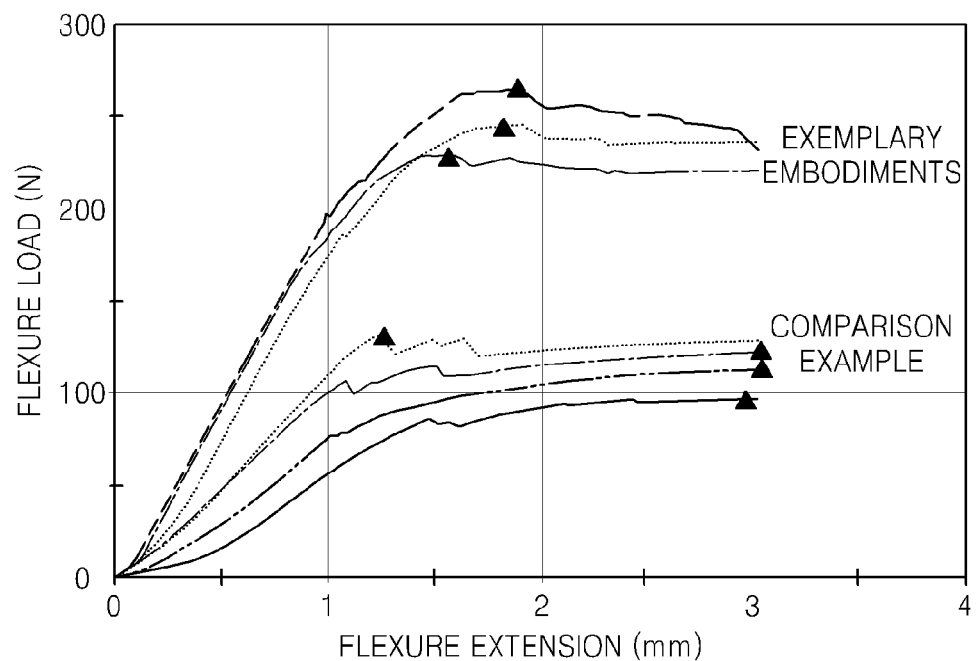
FIG. 5 is a graph illustrating a bending rigidity of a battery cell according to an aspect of the present embodiments.

FIG. 5 is a graph illustrating a bending rigidity of a battery cell according to exemplary embodiments of the present disclosure and compared to bending rigidity of a battery cell according to a comparison example. The bending rigidity of the battery cell according to a comparison example of the present invention is the bending rigidity of a battery cell of a general lithium ion battery that does not include the instant described reinforcing material.

Referring to FIG. 5, the bending rigidity of the battery cell according to an aspect of the present embodiments may be enhanced at least about 2 times compared to the bending rigidity of the battery cell according to the comparison example.

Figure 6:
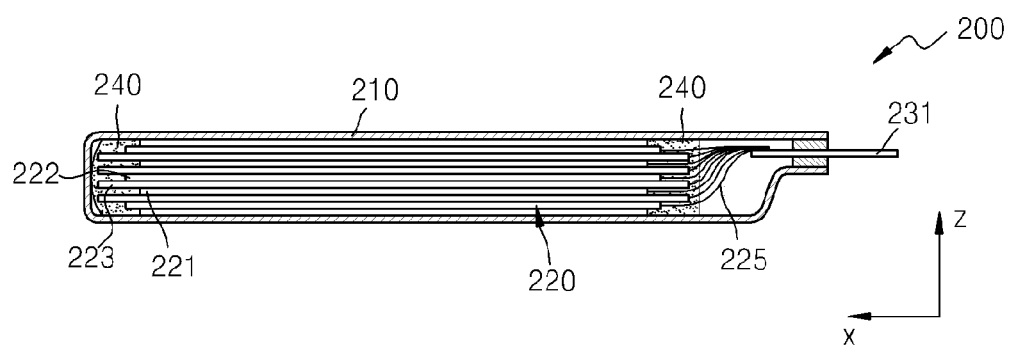
FIG. 6 is a side cross-sectional view illustrating a state where a battery cell is cut in a direction in which electrode tabs extend according to another aspect of the present embodiments.

Although the electrode assembly 120 is wound in the jelly-roll shape in an exemplary embodiment, the present embodiments are not limited thereto. For example, as shown in FIG. 6, a battery cell 200 may include a stack type electrode assembly 220 in which positive electrode plates 221, separators 223, and negative electrode plates 222 are sequentially stacked. In certain embodiments, the electrode assembly 220 in which a plurality of positive electrode plates 221, separators 223, and negative electrode plates 222 are stacked may be accommodated in a case 210 to provide a high output and mass capacity battery. In certain embodiments, the plurality of positive electrode plates 221 may be electrically coupled to a positive electrode tab 231 via conductive tabs 225. The same applies to the plurality of negative electrode plates 222. In certain embodiments, the battery cell 200 may include a reinforcing material 240 disposed between a first end portion and a second end portion of the electrode assembly 220.

Figure 7:
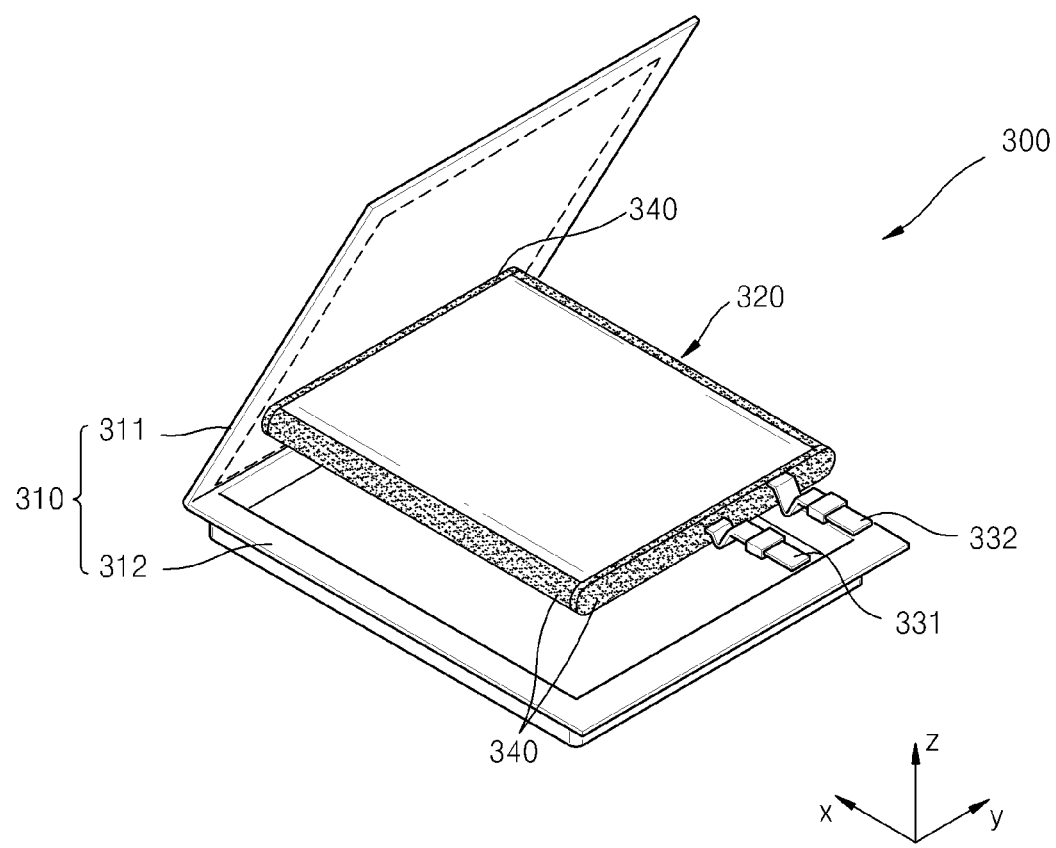
FIG. 7 is an exploded perspective view schematically illustrating a battery cell according to another aspect of the present embodiments.

FIG. 7 is an exploded perspective view schematically illustrating a battery cell 300 according to another aspect of the present embodiments.

Referring to FIG. 7, the battery cell 300 that includes a case 310, an electrode assembly 320 accommodated inside the case 310, a reinforcing material 340, and electrode tabs 330 electrically connected to the electrode assembly 320 is the same as the battery cells 100 and 200 described with reference to FIGS. 1 through 4. In some embodiments, the case 310 accommodates the electrode assembly 320, the reinforcing material 340, and an electrolyte therein, and may include an upper case 311 and a lower case 312 as shown in FIG. 7. In certain embodiments, the upper case 311 and the lower case 312 may be integrally bonded to each other along edges thereof to seal the electrode assembly 320.

However, the battery cell 300 in which the reinforcing material 340 surrounds the side wall of the electrode assembly 320 is different from the battery cells 100 and 200. For example, the reinforcing material 340 may be hardened after being applied to first and second end portions of the electrode assembly 320 or may be hardened after being applied to lateral portions thereof at a right angle with the first and second end portions, thereby protecting a step formed between the first and second end portions of the electrode assembly 320 and simultaneously further enhancing rigidity of the battery cell 300.

Figure 8:
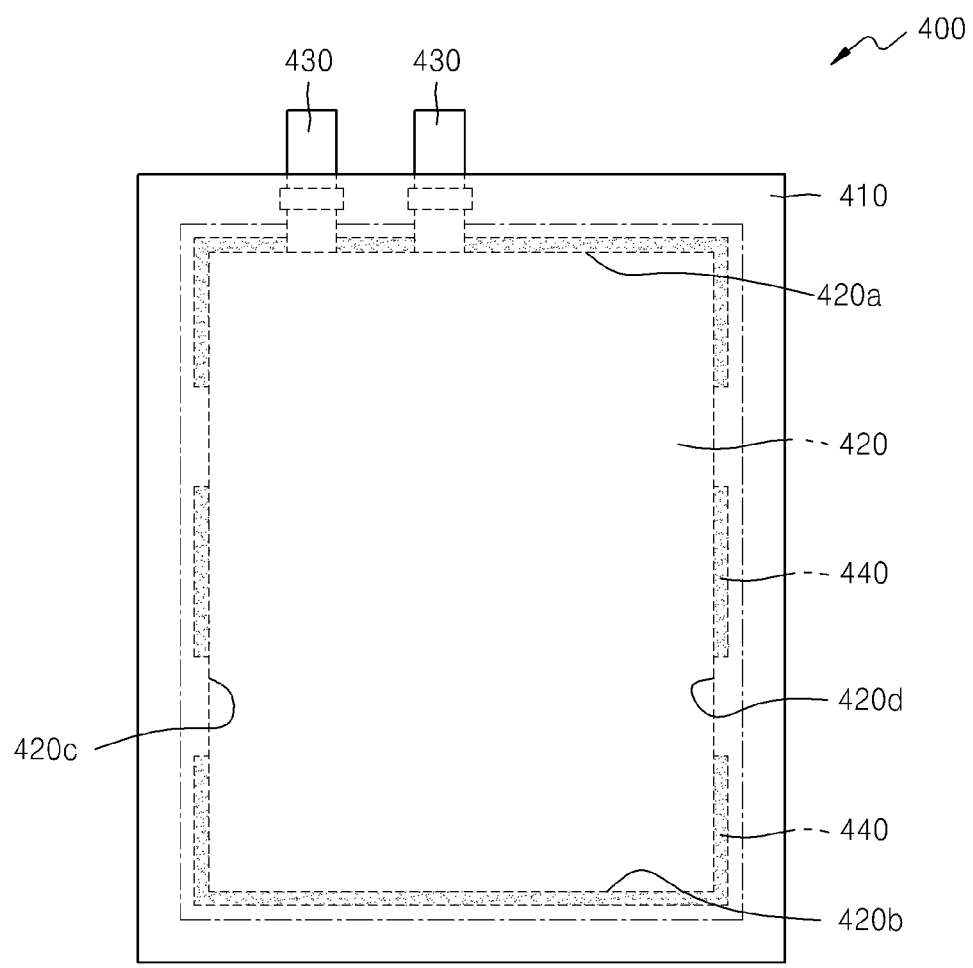
FIG. 8 is a top projective view schematically illustrating a battery cell according to another aspect of the present embodiments.

Although the reinforcing material 340 surrounds edges of the electrode assembly 320 in an exemplary embodiment, the present embodiments are not limited thereto. For example, as shown in FIG. 8, a reinforcing material 440 may be continuously formed along first and second end portions 420a and 420b of an electrode assembly 420, and may be discontinuously formed along lateral portions 420c and 420d thereof.

Although a case is manufactured as a pouch type according to an exemplary embodiment, the present embodiments is not limited thereto. For example, a reinforcing material may be included in a battery cell manufactured as a can type.

Although polymer gel included in a reinforcing material includes an adhesive material so that the reinforcing material is adhered to an electrode assembly in an exemplary embodiment, the present embodiments are not limited thereto. For example, a reinforcing material may be adhered to an electrode assembly via a separate adhesive agent.

As described above, according to the one or more of the above embodiments, a reinforcing material may be disposed between an electrode assembly and a case, thereby enhancing stability and rigidity of a battery cell and protecting a step of the electrode assembly.

Furthermore, the reinforcing material may be easily manufactured at relatively low cost, thereby reducing manufacturing costs of the battery cell and enhancing mass production efficiency.

While the present embodiments have been particularly shown and described with reference to exemplary embodiments thereof, it will be understood by those of ordinary skill in the art that various changes in form and details may be made therein without departing from the spirit and scope of the present embodiments as defined by the following claims.

What is claimed is:

1. A battery cell comprising:
   an electrode assembly, wherein the electrode assembly comprises a first electrode plate, a second electrode plate, and a separator disposed between the first electrode plate and the second electrode plate;
   electrode tabs connected to the first electrode plate and the second electrode plate, and extending from one side of the electrode assembly;
   a case for sealing the electrode assembly and an electrolyte; and
   a reinforcing material disposed in at least a region between the electrode assembly and the case, and comprising ceramic material and a polymer gel, wherein the first electrode plate, the second electrode plate, and the separator are configured to have different sizes so that an edge of the electrode assembly has a stair step configuration, and
   wherein the reinforcing material covers the step-shaped edge of the electrode assembly.

2. The battery cell of claim 1, wherein the reinforcing material is adhered to the electrode assembly.

3. The battery cell of claim 1, wherein the electrode assembly has a first end portion and a second end portion, and wherein the reinforcing material is adhered to the electrode assembly, and is adhered to at least one of the first end portion of the electrode assembly from which the electrode tabs extend and the second end portion of the electrode assembly disposed in an opposite end to which the first end portion is disposed.

4. The battery cell of claim 1, wherein the reinforcing material is adhered to the electrode assembly to surround sides thereof.

5. The battery cell of claim 1, wherein the edge of the electrode assembly is at least one of the first end portion of the electrode assembly from which the electrode tabs extend and the second end portion of the electrode assembly disposed in an opposite direction to which the first end portion is disposed.

6. The battery cell of claim 1, wherein the ceramic material is from about 25% to about 80% of the reinforcing material.

7. The battery cell of claim 1, wherein the reinforcing material comprises 100 parts by weight of the polymer gel and about 40 to about 400 parts by weight of the ceramic material.

8. The battery cell of claim 1, wherein the reinforcing material comprises 100 parts by weight of the ceramic material and 80 or higher parts by weight of the polymer gel.

9. The battery cell of claim 1, wherein the ceramic material comprises at least one component selected from the group consisting of aluminum oxide ($Al_2O_3$), titanium dioxide ($TiO_2$), barium titanate ($BaTiO_3$), silicon dioxide ($SiO_2$), magnesium oxide (MgO), and zinc oxide (ZnO).

10. The battery cell of claim 1, wherein the polymer gel is adhesive.

11. The battery cell of claim 1, wherein the polymer gel comprises acrylate-based polymer or PVDF-based polymer.

12. The battery cell of claim 1, wherein the separator comprises at least one material selected from the group consisting of polyethylene (PE), polyetyrene (PS), polypropylene, and co-polymer of PE and polypropylene; and polyvinylidene fluoride-cohexafluoropropylene (PVDF-HFP) co-polymer, and wherein the separator is manufactured by coating at least one material selected from the group consisting of polyethylene (PE), polyetyrene (PS), polypropylene, and co-polymer of PE and polypropylene with polyvinylidene fluoride-co-hexafluoropropylene (PVDF-HFP) co-polymer.

13. The battery cell of claim 1, wherein the case is a soft pouch type.

14. A secondary battery comprising a battery cell; a reinforcing material for the battery cell; an electrode assembly; wherein the electrode assembly comprises a first electrode plate, a second electrode plate, and a separator disposed between the first electrode plate and the second electrode plate; an electrolyte; and a case for sealing the electrode assembly and the electrolyte, wherein the reinforcing material is disposed between the electrode assembly and the case, and said reinforcing material further comprises ceramic material and a polymer gel, wherein the first electrode plate, the second electrode plate, and the separator are configured to have different sizes so, wherein an edge of the electrode assembly has a stair step configuration, and wherein the reinforcing material covers the step-shaped edge of the electrode assembly.

15. The secondary battery of claim 14, wherein the reinforcing material comprises 100 parts by weight of the polymer gel and about 40 to about 400 parts by weight of the ceramic material.

16. The secondary battery of claim 14, wherein the reinforcing material comprises 100 parts by weight of the ceramic material and 80 or higher parts by weight of the polymer gel.

17. The secondary battery of claim 14, wherein the polymer gel is adhesive.

18. The secondary battery of claim 14, wherein the ceramic material comprises any one selected from the group consisting of $Al_2O_3$, $TiO_2$, $BaTiO_3$, $SiO_2$, MgO, and ZnO.

19. The battery cell of claim 1, wherein the polymer gel comprises acrylate-based polymer or PVDF-based polymer.

* * * * *